March 11, 1941.  G. I. BOCCASILE  2,234,228

MATERIALS TESTING APPARATUS

Filed April 2, 1938

INVENTOR
Graziano I. Boccasile
BY
W. M. Wilson
ATTORNEY

Patented Mar. 11, 1941

2,234,228

UNITED STATES PATENT OFFICE 2,234,228

MATERIALS TESTING APPARATUS

Graziano I. Boccasile, West Springfield, Mass.

Application April 2, 1938, Serial No. 199,682

9 Claims. (Cl. 265—10)

This case relates to a testing machine for measuring frictional torque.

The general object of the invention is to provide a novel means to measure frictional torque.

The object is, further, to provide novel means to exert variable or adjustable pressure or force on a testing lever.

The object is, still further, to provide floating connections between a testing shaft and the test lever.

Another object is to provide a novel test bearing to be used in connection with the test lever.

Further objects of the instant invention reside in any novel feature of construction or operation or novel combination of parts present in the embodiment of the invention described and shown in the accompanying drawing, whether within or without the scope of the appended claims and irrespective of other specific statements as to the scope of the invention contained herein.

Figure 1:
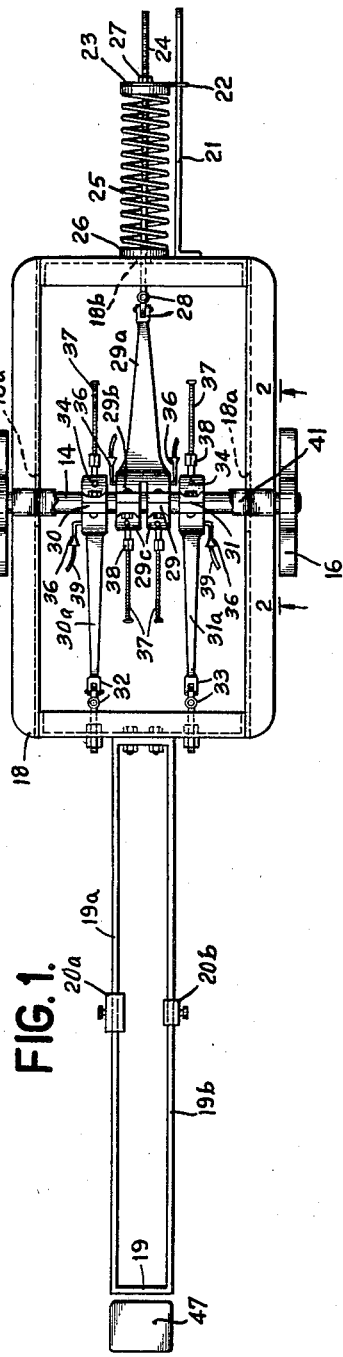
Fig. 1 is a plan view of the testing machine, with parts broken away.

The testing machine may be applied, as examples, to testing of bearings (bearing design and material), of lubricants, and of methods of lubrication.

The apparatus includes a motor (not shown), driving a shaft 10 which enters a transmission box 11, from which a driven shaft 12 protrudes. Shaft 12, through belt and pulley connections 13, rotates test shaft 14. Suitable means are provided in the transmission for enabling the speed of shaft 14 to be varied, and the direction of rotation of shaft 14 may be reversed either through suitable means in the transmission or by reversing the motor.

Test shaft 14 is journaled in suitable bearings carried by a pair of standards 15 and 16 located on either side of an open rectangular frame 18. The sides of this frame are provided with holes 18a through which shaft 14 passes with adequate clearance. To the left end of frame 18 is fixed a beam 19 having arms 19a and 19b, each graduated in inches and tenths of inches. Arm 19a carries a one pound poise 20a which reads the torque to tenths of an inch-pound, while arm 19b carries a tenth of a pound poise to read the torque to hundredths of an inch-pound.

To the right end of frame 18 is fixed a bar 21, one face of which is graduated to read pounds, and the graduations of which are scanned by an index 22 extending from a disk 23 which surrounds a rod 24. Surrounding this rod is a heavy coil spring 25, confined between the aforesaid disk 23 and a spacer disk 26 flat against the right end of frame 18. Rod 24 is threaded and on its outer end carries a nut 27 acting on disk 23. Adjustment of nut 27 changes the degree of compression of spring 25 and, consequently, varies the force with which the spring urges rod 24 to the right. The desired spring pressure is measured in pounds by coaction of the said index 22 with the graduated scale of bar 21.

Figure 3:
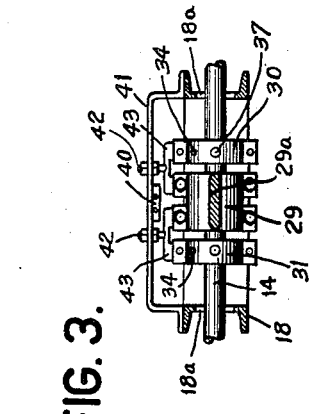
Fig. 3 is a section on lines 3—3 of Fig. 2.

Rod 24 passes, with clearance, through a hole 18b in the right side of frame 18 and its left end is connected through a universal joint 28 with an arm 29a integrally extending from a half section 29b of a duplex split collar 29. The other half of collar 29 comprises similar semi-circular elements 29c which may be bolted individually to collar section 29b. Collar 29 is referred to as a "duplex" collar, because it is adapted to hold two bearings side by side, and, therefore, is equivalent to two collars, each to hold one bearing. Located at opposite sides of collar 29 are split collars 30 and 31, respectively, provided with arms 30a and 31a extending oppositely to arm 29a. Arms 30a and 31a are connected by universal joints 32 and 33 to the left end of frame 18. Collars 29, 30, and 31 serve as holders for rotatry test bearings B (see Figs. 3 and 4) adapted to engage test shaft 14. To insert a test bearing in a collar 29, 30 or 31, the shaft 14 is first removed, then the collar sections separated, the bearing B inserted, and the collar sections reassembled. The bearing is tightly clamped in place by the collar sections, and to prevent any possible rotation of the bearing relative to the collar, set screws 34 are also provided. The bearings B are thus rigidly mounted in collars 29, 30 and 31, after which the shaft 14 is slipped through bearings B and back into place.

Figure 4:
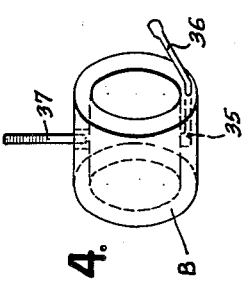
Fig. 4 is a perspective detail view of a test bearing.

Each test bearing B is specially formed, as indicated in Fig. 4, with a canal 35 opening at one end on the inner cylindrical face of the bearing and at the other end communicating with a short pipe 36 rigidly fastened to one side of the bearing. Each bearing also is formed with means to secure thereto a temperature measuring instrument which may be either a thermocouple or a thermometer 37. The temperature measuring instrument is so fastened to the bearing as to measure the heat of the oil film at the inner cylindrical face of the bearing. The short half sections of split collars, 29, 30 and 31, are provided with guide nipples 38 through which the thermometers 37 are led from the bearings to the exterior of the collars, so that their readings may be viewed by an observer. The short pipes 36 of the bearings are connected by flexible tubing 39 to an oil reservoir 40 (Fig. 3) carried by an inverted U-shaped bridge bar 41 fixed to the top of the sides of frame 18. The oil is supplied to reservoir 40 either under pressure by a suitable pump (not shown) or by a gravity feed from an oil supply. From reservoir 40, the oil is equally distributed through tubing 39 and pipes 36 to the interior of bearings B.

When the bearings B are in place on shaft 14, they and the collars 29, 30 and 31 are directly supported by the shaft. The frame 18 and the parts carried thereby are then connected indirectly to shaft 14 through universal joint connections 28, 32, and 33. The frame 18 and parts carried thereby comprise the testing lever which, being connected to shaft 14 through the universal joints, may be considered as having a floating mounting on or connection to the shaft. Due to this floating or universal mounting, each of the bearings B may be individually set on shaft 14 so as to maintain full contact, along the entire length of its bearing surface, with the shaft during rotation of the latter. Thus, all the bearings in the collars 29, 30, and 31 preserve full bearing contact with shaft 14 along the entire length of the bearing surfaces, a condition which would be difficult, if not impossible, to attain were the collars 29, 30, and 31 rigidly connected to the frame 18. The universal or flexible joints enable the testing lever to accommodate itself to the condition in which bearings B are in full contact along their bearing surfaces with shaft 14. The weight of the testing lever is transmitted to collars 29, 30, and 31, and to the bearings B inside the collar by these same universal joint connections. In order to equalize the weight of the testing lever with respect to bearings B, bridge bar 41 has adjustably secured thereto depending rods 42 to the lower ends of which are pivoted the central points of two equalizing plates 43, the adjacent ends of which are adapted to rest on top of the duplex collar 29 and the outer ends of which are adapted to individually rest on collars 30 and 31. By adjusting rods 42 to the proper length, equalizers 43 may be set to distribute equally the weight of the floating test lever to each of the four bearings B.

It may be understood, from above description, that shaft 14 tends frictionally to rotate bearings B, and that such rotation of bearings B is resisted by the testing lever. The frictional torque with which the shaft 14 tends to rotate the bearings B, and through the latter, the testing lever is dependent upon the pressure between the shaft and the bearings, and which pressure may be referred to as the bearing pressure. This bearing pressure may be adjusted to any desired amount, measured in total pounds along the scale of bar 21 by adjusting the coil spring 25 through adjustment of nut 27. Spring 25 urges disks 23 and rod 24 to the right, and the rod acts through arm 29a and collar 29 for transmitting the force exerted by the spring to the bearings B inside collar 29. As the latter bearings exert pressure on one side of shaft 14, the opposite side of the latter is pressed, with equal force, against the bearings B inside collars 30 and 31. In above manner, the bearing pressure, determined by adjustment of coil spring 25, is equally distributed to the four bearings B to act on shaft 14. The frictional torque exerted by shaft 14 on bearings B is a product of the bearing pressure (the weight of the testing lever may be compensated for and ignored as a constant) times the radius of the shaft, times the coefficient of friction of the bearing material. The counterbalancing torque exerted by the testing lever is a product of the moment arm of the lever and the weight of poises 20a and 20b. Thus, by measuring the counterbalancing torque exerted by the testing lever, the torque exerted on bearings B by shaft 14 may be determined.

With shaft 14 at rest, the testing lever is in equilibrium or in balance with poises 20a and 20b at about the mid points of scale arms 19a and 19b. To avoid the necessity, upon each test, of preliminarily and exactly balancing the scale at a "0" point or determining the true balance point of the testing lever, each test is run with shaft 14 first rotated in one direction and then in the opposite direction. The average reading which is then obtained compensates for and cancels out any errors or variations in the balance of the testing lever, due to adjustment of the length of spring 25 and associated parts or due to any other causes.

Figure 2:
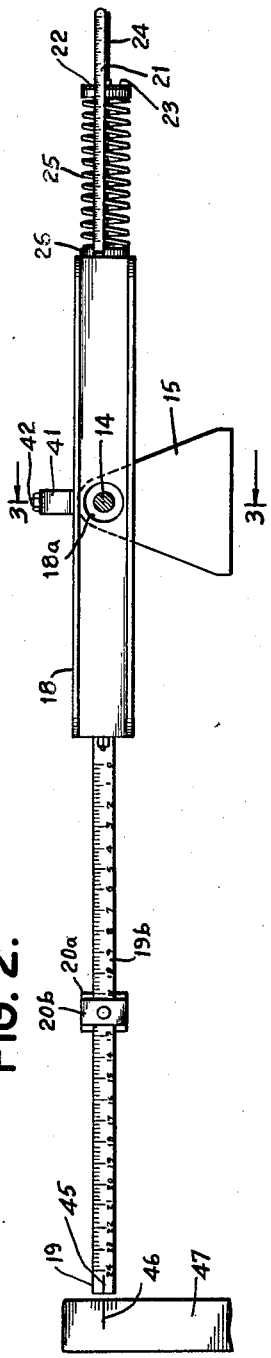
Fig. 2 is a section on lines 2—2 of Fig. 1.

When shaft 14 is rotated clockwise (as viewed in Fig. 2), due to the frictional torque exerted thereby on bearings B, the shaft tends to rock the testing lever in the same direction. To counterbalance the frictional torque exerted by rotating shaft 14, poises 20a and 20b are adjusted until the beam 19 is in balance as indicated by alignment of index line 45 on the arm 20b with a fixed index line 46 on a fixed post 47. The reading of poises 20a and 20b then gives a measurement of the torque exerted by clockwise rotation of shaft 14. The shaft is then rotated counterclockwise and poises 20a and 20b again adjusted to balance the testing lever. The readings of the poises then measure the frictional torque exerted by counterclockwise rotation of the shaft. When the graduations on beam 19 start from "0", as shown in Fig. 1, and progressively increase to the outer end of the beam, the average torque is then obtained by subtracting the counterclockwise reading from the clockwise reading and dividing by two. Were the "0" graduation to be at the mid points of arms 19a and 19b, the clockwise and counterclockwise readings would be added and their sum divided by two to give the average torque. In either case, the average torque would be a true measure of the frictional torque exerted on bearings B by shaft 14, with all the errors due to inexact preliminary balance of the testing lever (when shaft 14 is at rest) balanced out. Also, such errors as are due to the particular direction of rotation of the shaft are canceled out of consideration, leaving the average torque as the true measure of the frictional torque exerted by shaft 14.

In running a test, the following readings are taken:

1. Temperature of oil film (from thermometers 37).
2. The load or bearing pressure (index 22 against scale 21).
3. The oil pressure (when a pressure feed is used) or the oil head (when a gravity feed is used).
4. The speed of shaft 14.
5. The frictional torque (poises 20a and 20b on scale arms 19a and 19b).

Various graphs of the performance of the parts or material or methods of lubrication under test may be drawn up using the above factors. For example, assume it is desired to test the design and material of certain bearings B, then collars 29, 30, and 31 are loosened, shaft 14 removed, the bearings to be tested slipped into the collars and rigidly fixed therein, and then the shaft 14 slipped back, through these bearings, into place. Average torque readings may then be taken with varying amounts of bearing pressure obtained by adjustment of spring 25. A graph may then be drawn, plotting the torques against the bearing pressures. Another graph may be drawn, plotting the temperatures against the speeds of shaft 14, or plotting the speeds of shaft 14 against the torques, and so on. By comparing these graphs with standard graphs, the performance of the bearings under test may be determined.

As another example, assume it is desired to test different lubricants. Tests are then run with different oils using the same bearings B. Graphs may then be drawn, plotting any two of the above listed five factors against each other, and from the graphs a comparison of the performance of different lubricants may be obtained.

Similarly, different methods of lubricating the bearings may be tested. For example, a comparison may be made of a pressure feed, gravity feed, or splash lubricating system.

Also, it is possible to run performance tests on shafts 14 of different material and hardness.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. Testing apparatus comprising a test lever, a rotatable test shaft, a plurality of separate bearings arranged side by side along said shaft and having bearing engagement therewith, means to tie the bearings to the lever positively and constructed and arranged for floatingly mounting the lever on said bearings to enable the bearings to individually set themselves, relative to the lever, on the shaft so as to have full bearing engagement along their entire bearing surfaces with the shaft, said mounting transmitting the effect of the frictional torque, exerted during rotation of the shaft on the bearings, to the lever, and means coacting with the lever for measuring said torque.

2. Testing apparatus comprising a test lever operatively mounted on a rotatable test shaft through means including bearings arranged side by side along the shaft and engaged therewith for causing the lever to be rocked, during rotation of the shaft, in accordance with the frictional torque exerted by the shaft against the bearings, said means also including, intermediate the lever and bearings, connections positively tying the lever to the bearings and universally adjustable to enable the bearings to individually move relatively to the lever to aline their entire bearing surfaces with the shaft so as to maintain full bearing engagement therewith, and means coacting with the lever to measure the frictional torque.

3. As a subcombination in a testing apparatus, a rotating test shaft, a plurality of bearings arranged side by side along said shaft and having individual bearing contact therewith, a test lever having a floating mounting on said bearings, to be rocked by the frictional torque exerted by the shaft on said bearings, and means on the lever for equalizing the weight of the lever with respect to said bearings during rotation of the shaft.

4. Testing apparatus in which bearing means have bearing engagement with a rotating shaft, comprising a lever, means mounting and supporting the lever solely on the bearing means and including universal self-adjusting, positive connections between the lever and bearing means tying them together for common rocking movement about the shaft under the influence of the friction torque applied by the shaft to the bearing means while also enabling the bearing means to move relatively to the lever to align the bearing surfaces thereof with the shaft to have true and full bearing engagement therewith, and means coacting with the lever to counterbalance the applied torque.

5. Testing apparatus in which bearing means have bearing engagement with a rotatable shaft, comprising a lever provided with an open rectangular framework, the opposite ends of which are located at opposite sides of the bearing means and shaft, means mounting the lever solely on the bearing means and including universal self-adjusting, positive connections between the opposite ends of said lever framework and the opposite sides of the bearing means for tying the lever and bearing means together for common rocking movement about the shaft under the influence of the friction torque applied by the shaft to the bearing means while also enabling the bearing means to adjust the bearing surfaces thereof, relative to the lever, into true and full bearing engagement with the shaft, said open framework enabling the lever and mounting means to be disposed in a substantially common plane, and means coacting with the lever to oppose the applied torque.

6. Testing apparatus in which bearing means have bearing engagement with a rotating shaft, comprising a lever with its lever arms extending to opposite sides of the shaft, means mounting the lever solely upon the bearing means for common rocking movement about the shaft under the influence of the friction torque applied by the shaft to the bearing means, said mounting means including oppositely directed rigid extensions of the bearing means and universal self-adjusting, positive connections between each lever arm and the adjacent one of the aforesaid extensions for tying the lever and bearing means together for said common rocking movement while enabling the bearing means to adjust the bearing surfaces thereof, relatively to the lever, into true, full bearing engagement with the shaft, and means coacting with the lever to counterbalance the applied torque.

7. Testing apparatus in which bearings have friction bearing engagement with a rotatable shaft, comprising a test lever having lever arms extending to opposite sides of said shaft, collars fixed to and surrounding said bearings and provided with rigid extensions extending in opposite directions from said collars, and universal self-adjusting, positive connections between each lever arm and the correspondingly extending collar extension for floatingly mounting said lever solely on said collars to be rocked in accordance with the frictional torque exerted by the shaft on the bearings.

8. Testing apparatus in which bearing means have bearing engagement with a rotating shaft, comprising a lever, means mounting the lever solely on the bearing means and including universal self-adjusting, positive connections between the lever and bearing means tying them together for common rocking movement about the shaft under the influence of the friction torque applied by the shaft to the bearing means while enabling the bearing means to adjust the bearing surfaces thereof, relatively to the lever, into true, full bearing engagement with the shaft, means coacting with the lever for opposing the applied torque, and pressure applying means bodily carried by the lever for movement therewith and acting on the bearing means to press the bearing means against the shaft with an unchanging pressure during the rocking movement of the lever and bearing means.

9. The apparatus as defined in claim 8, said pressure applying means being adjustable to vary the pressure of the bearing means against the shaft, and acting on the bearing means through one of the universal self-adjusting connections between the lever and bearing means.

GRAZIANO I. BOCCASILE.